United States Patent
Wang

(10) Patent No.: US 6,717,498 B1
(45) Date of Patent: Apr. 6, 2004

(54) MAGNETIC BODY

(76) Inventor: Jen-Chieh Wang, 2nd Fl., No. 31-1, Alley 452, Ta-Yih Rd., Taipei (TW)

(*) Notice: Subject to any disclaimer, the term of this patent is extended or adjusted under 35 U.S.C. 154(b) by 0 days.

(21) Appl. No.: 10/377,641

(22) Filed: Mar. 4, 2003

(51) Int. Cl.[7] .................................................. H01F 7/02
(52) U.S. Cl. ........................................ 335/305; 335/302
(58) Field of Search ................................. 335/302–306

(56) References Cited

U.S. PATENT DOCUMENTS 3,607,528 A * 9/1971 Gassaway .................... 156/230

* cited by examiner

Primary Examiner—Ramon M. Barrera
(74) Attorney, Agent, or Firm—Rosenberg, Klein & Lee

(57) ABSTRACT

A magnetic body includes a disc-shaped carrier having one or more layers of magnetic powder that is blended with a viscous liquid and sprayed on outer surfaces of the carrier. Magnetic lines of the magnetic body together with earth poles produce a radiated magnetic field. When the magnetic body is positioned in a vehicle fuel tank cap, the radiated magnetic field produced by the magnetic body causes magnetization and rearrangement of fuel surface molecules and/or air molecules in the limited space in the fuel tank to enable effective fuel volatilization and accordingly upgraded kinetic energy efficiency of a vehicle engine.

5 Claims, 4 Drawing Sheets

MAGNETIC BODY

FIELD OF THE INVENTION

The present invention relates to a magnetic body, and more particularly to a magnetic body that enables magnetization and rearrangement of liquid molecules, such as fuel molecules, or air molecules within a limited space, and can therefore upgrade a kinetic energy efficiency of a vehicle engine.

BACKGROUND OF THE INVENTION

Magnetic lines have been widely applied to and proven effective in different fields. There are also patent applications involving magnetic lines being allowed in many countries. It is an incorrect concept of most people that the distribution of magnetic lines is always in a plane. As a matter of fact, magnetic lines are radially distributed in a space. It is also known that more than 98% of tiny particles in the air are diametrically smaller than 1 micrometer (micron). These tiny particles are almost not affected or carried away by airflow when they diffuse from a local area, but are affected by magnetic lines produced by surrounding electric fields.

Many water filters and magnetic-energy-based activators employing the principle of magnetic lines have been successfully developed and granted with a patent. While the magnetic lines have been used to activate and/or magnetize water molecules, they are not used in magnetization of fuel molecules to upgrade engine performance up to date.

It is therefore tried by the inventor to apply the principle of magnetic lines to the magnetization of vehicle fuel in an attempt to upgrade the vehicle engine performance and achieve the goal of energy saving.

SUMMARY OF THE INVENTION

A primary object of the present invention is to provide an improved magnetic body for mounting in a vehicle fuel tank cap to enable magnetization and rearrangement of molecules of fuel in a fuel tank, so that the fuel effectively volatiles for a vehicle engine to have upgraded kinetic energy efficiency.

The magnetic body of the present invention includes a substantially disc-shaped carrier, outer surfaces of which are sprayed with one or more layers of magnetic powder blended with a viscous liquid.

Magnetic lines of the magnetic body of the present invention together with earth poles produce a radiated magnetic field, enabling the magnetic body to be used without being limited to a certain magnetic field direction and/or region.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
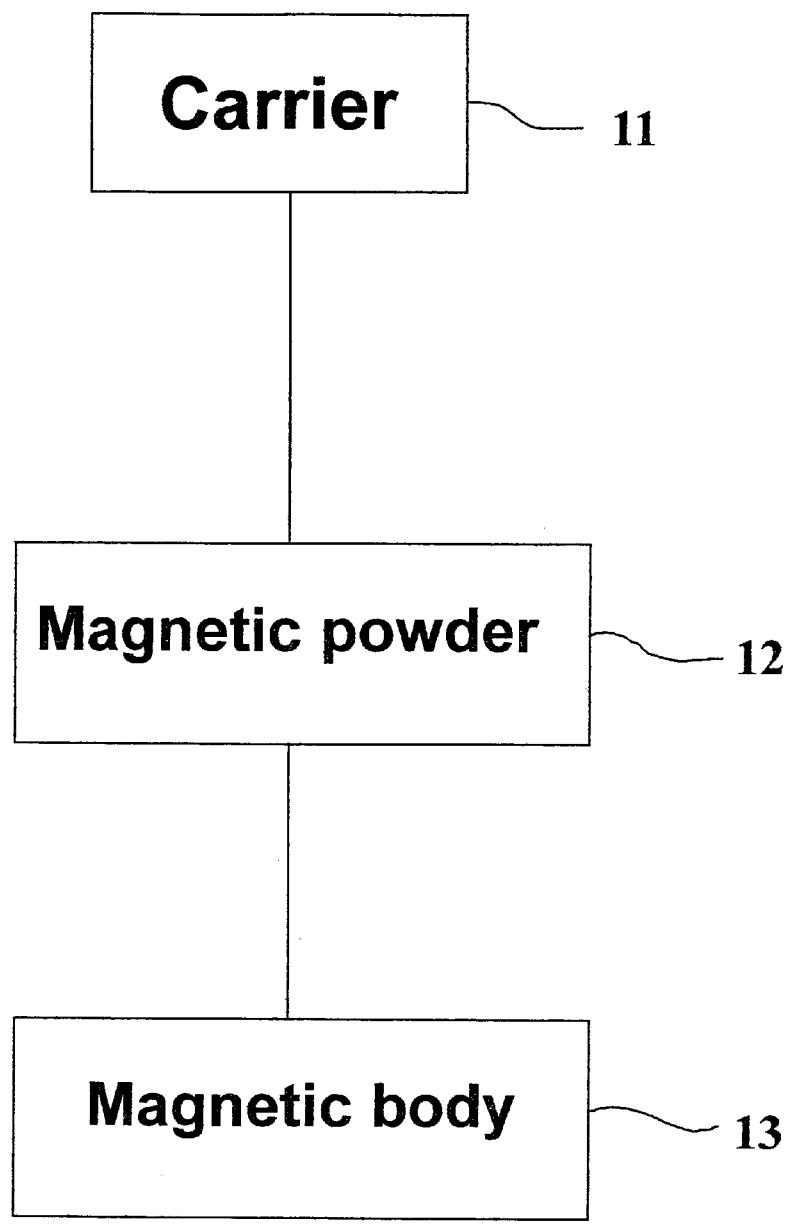
FIG. 1 is a flowchart showing the production of a magnetic body of the present invention.

Please refer to FIG. 1 that is a flowchart showing the production of a magnetic body of the present invention. A disc-shaped carrier 11 is sprayed over outer surfaces with one or more layers of magnetic powder 12 blended with a viscous liquid to form a disc-shaped magnetic body 13. An overall thickness of the magnetic powder 12 attached to the outer surfaces of the carrier 11 depends on the number of layers of the sprayed magnetic powder 12. Magnetic lines of the magnetic body 13 of the present invention together with earth poles produce a radiated magnetic field, enabling the magnetic body 13 to be used without being limited to a certain magnetic field direction and/or region.

Figure 2:
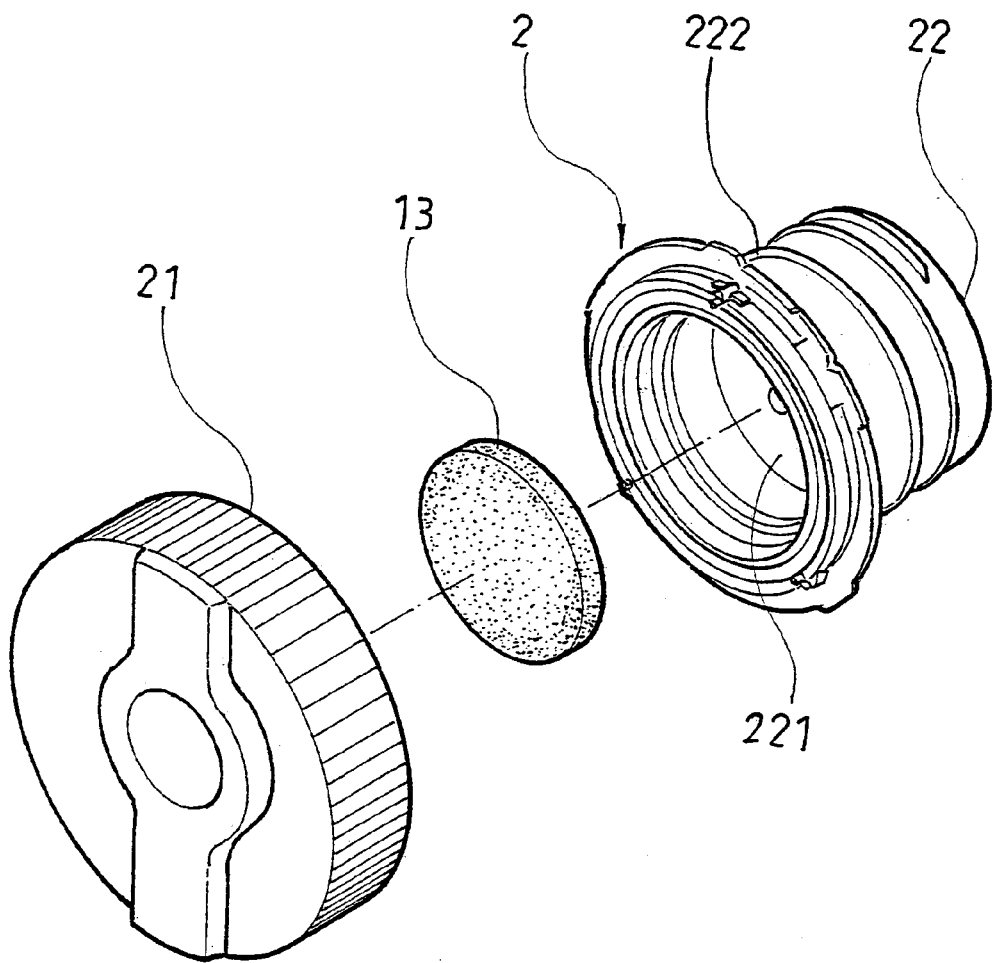
FIG. 2 is an exploded perspective view showing the positioning of a magnetic body of the present invention in a fuel tank cap.
Figure 3:
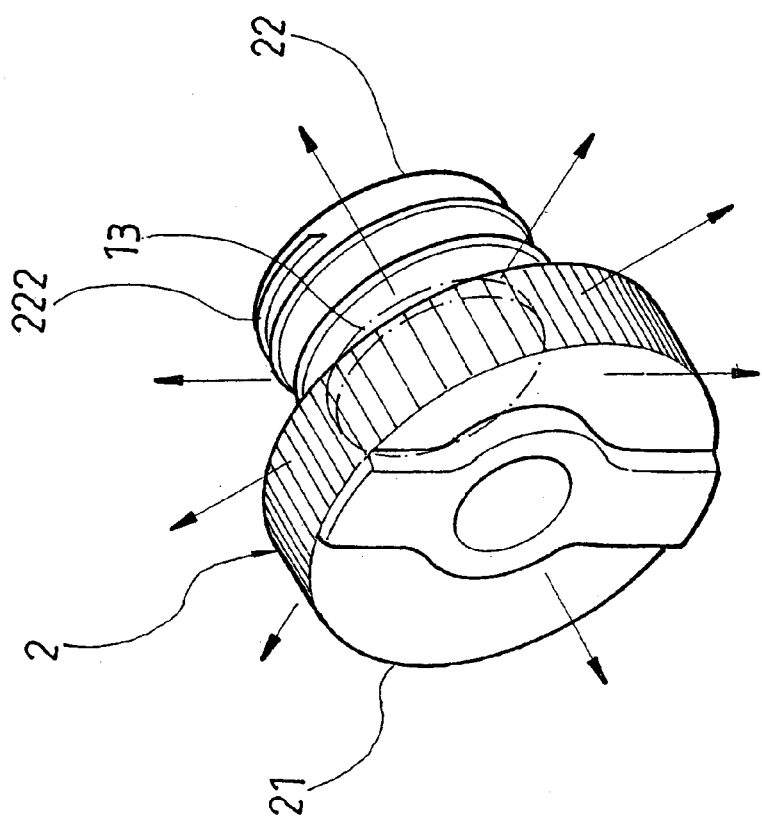
FIG. 3 is an assembled perspective view of FIG. 2.

Please refer to FIGS. 2 and 3 that are exploded and assembled perspective views, respectively, showing the positioning of the magnetic body 13 in a fuel tank cap 2 for a vehicle. The fuel tank cap 2 includes a cap portion 21 and a plug portion 22. The plug portion 22 is provided at an inner end with a chamber 221 and at an outer end with external threads 222. The magnetic body 13 is positioned in the chamber 221 before the cap portion 21 is closed onto the inner end of the plug portion 22 to provide a complete fuel tank cap 2. When the fuel tank cap 2 is screwed at the plug portion 22 with the external threads 222 to an inlet of a fuel tank, the magnetic body 13 in the chamber 221 of the plug portion 22 together with earth poles produces a radiated magnetic field, which causes magnetization and rearrangement of molecules of fuel in the fuel tank to enable effective fuel volatilization and upgraded kinetic energy efficiency of engine of the vehicle, as well as realization of energy saving.

Figure 4:
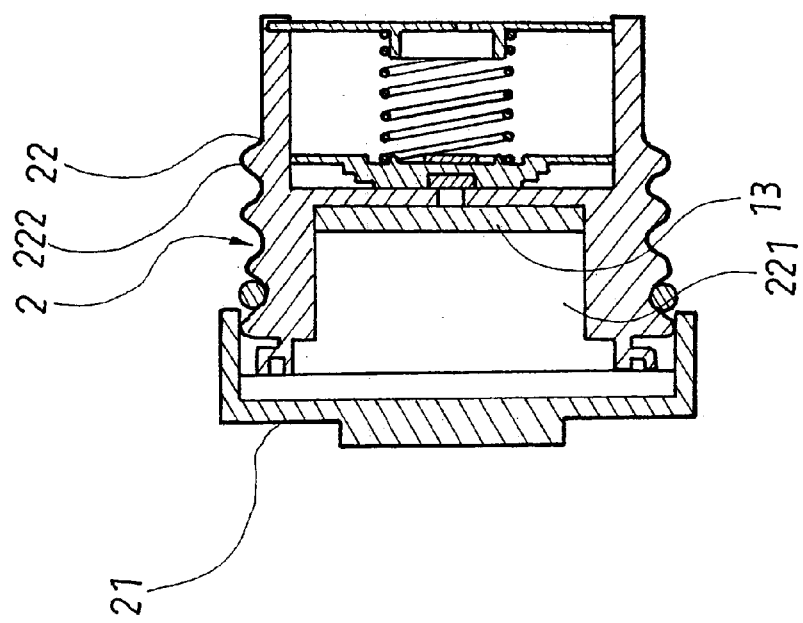
FIG. 4 is a sectioned side view of FIG. 3.

Please refer to FIG. 4 that is a sectioned side view of the fuel tank cap 2 in an assembled state. In practical application of the present invention, the magnetic body 13 is positioned in the chamber 221 formed at the inner end of the plug portion 22 of the fuel tank cap 2. When the fuel tank cap 2 is screwed onto the fuel tank, the magnetic body 13 causes magnetization of fuel molecules in the fuel tank for the fuel to effectively volatile that in turn upgrades the engine efficiency and reduces fuel consumption.

What is claimed is:

1. A fuel tank cap apparatus comprising:
   (a) a cap portion;
   (b) a plug portion coupled to said cap portion for engaging an opening of a fuel tank, said cap and plug portions defining an inner chamber;
   (c) a magnetic body disposed within said inner chamber, said magnetic body including a substantially disc-shaped carrier, said disc-shaped carrier having formed thereon at least one layer of a magnetic powder coating, said magnetic body being disposed to generate a magnetic field for magnetic coupling with fuel contained within the fuel tank.

2. The fuel tank cap apparatus as recited in claim 1 wherein said disc-shaped carrier is enveloped by at least one spray-coated layer of said magnetic powder coating.

3. The fuel tank cap apparatus as recited in claim 2 wherein said pray-coated layer includes a viscous liquid having said magnetic powder coating blended therein.

4. The fuel tank cap apparatus as recited in claim 1 wherein said magnetic body is disposed within said inner compartment in a substantially coaxial orientation relative to said plug portion.

5. The fuel tank cap apparatus as recited in claim 1 wherein said magnetic body is formed with a solid cylindrical configuration.

* * * * *